Patented July 5, 1949

2,475,062

UNITED STATES PATENT OFFICE 2,475,062

PLASTICIZED POLYVINYL CHLORIDE COMPOSITIONS

Pliny O. Tawney, Passaic, N. J., assignor to United States Rubber Company, New York, N. Y., a corporation of New Jersey No Drawing. Application December 26, 1947, Serial No. 794,115

4 Claims. (Cl. 260—31.4)

This invention relates to plasticizing polyvinyl chloride.

I have found that improved polyvinyl chloride compositions are obtained with di-allyloxyethyl phthalate as the plasticizer for the polyvinyl chloride.

In carying out the present invention, the di-allyloxyethyl phthalate is mixed with the polyvinyl chloride either by blending to form cohesive sheets on a heated open roller mill, or in an internal mixer, at an elevated temperature, for example, 200° to 350° F., the particular temperature depending on the hardness of the polyvinyl chloride, or by grinding the finely powdered polyvinyl chloride with the plasticizer at room temperature in a ball mill, paint mill or the like to form a paste or plastisol which is capable of being gelled by subsequent heating to temperatures at which the resin is soluble in the plasticizer. Suitable proportions of the plasticizer range from about 30 to 100 parts, and preferably 50 to 80 parts, per 100 parts of polyvinyl chloride, by weight. The plasticizer of this invention softens and swells the polyvinyl chloride more readily than previously known phthalate plasticizers such as di-2-ethylhexyl phthalate. In addition, the physical properties of articles molded from polyvinyl chloride compositions plasticized with di-allyloxyethyl phthalate, such as tensile strength and percent elongation, are superior to those of polyvinyl chloride containing conventional phthalate plasticizers such as di-2-ethyl-hexyl phthalate. Molded, calendered or extruded articles may be made from the plasticized polyvinyl chloride in the usual way, or the compositions may be used for coating fabrics or for other uses. The polyvinyl chloride compositions may contain modifying agents, such as stabilizers, antioxidants, fillers, pigments.

The di-allyloxyethyl phthalate may be prepared by known methods, such as by boiling a mixture of allyloxyethanol with phthalic anhydride, benzene and an esterification catalyst such as p-toluene sulfonic acid. The water of esterification may be separated from the benzene-water azeotrope which distills off, and the benzene returned to the reaction mixture. On completion of the esterification, as indicated by the fact that no further water is liberated, the catalyst may be neutralized with a mild base, the benzene may be distilled off and the ester may be purified by fractional distillation in vacuo.

The following illustrates the preparation of di-allyloxyethyl phthalate, and its use as a plasticizer for polyvinyl chloride.

Di-allyloxyethyl phthalate was prepared by boiling the following mixture (parts by weight) in a distillation apparatus equipped with a condenser, a gravity separator for removing the water layer from the condensed benzene-water azeotrope, and a line for returning the benzene layer to the still pot:

| | Parts |
|---|---|
| Benzene | 250 |
| Phthalic anhydride | 296 |
| Allyloxyethanol | 510.7 |
| Para-toluene sulfonic acid | 10 |

The mixture was boiled at a pot temperature of about 106° C. while a benzene-water azeotrope was distilled off. The lower water layer was separated from the condensate in the gravity separator, and the upper benzene layer was returned to the still pot. After 18 hours no more water was liberated, indicating that esterification was complete. The catalyst was neutralized with 30 parts of calcium hydroxide and the precipitate was filtered off. The benzene was distilled off and the crude ester was purified by vacuum distillation. The di-allyloxyethyl phthalate was a colorless, oily liquid boiling at 215° C. at 3 mm. of mercury pressure and had a refractive index of 1.5074 (D line) at 20° C.

Mixtures were prepared on an open mill at about 280° F. from polyvinyl chloride and conventional calcium stearate stabilizer with di-allyloxyethyl phthalate and, for comparison, with di-2-ethylhexyl phthalate, in the following proportions:

| | Parts by Weight | |
|---|---|---|
| | Mix 1 | Mix 2 |
| Polyvinyl chloride | 100 | 100 |
| Calcium stearate | 3 | 3 |
| Di-allyloxyethyl phthalate | 65 | |
| Di-2-ethylhexyl phthalate | | 65 |

Specimens were molded from each mix at 287° F. for 20 minutes. The molds were cooled before removing the specimens, and the physical properties were found to be as follows:

| | Parts by Weight | |
|---|---|---|
| | Mix 1 | Mix 2 |
| Tensile strength at room temp. p. s. i. | 2,000 | 1,700 |
| Tensile strength at 212° F. p. s. i. | 300 | 255 |
| Per Cent elongation at break at room temp. | 310 | 240 |
| Per Cent elongation at break at 212° F. | 300 | 220 |
| Tear resistance, lbs. per 0.1″ thickness | 16.3 | 9.5 |
| Hardness (Shore Durometer, type A) | 70 | 70 |

These results show that for equal degree of plasticization, as indicated by the equal Durometer readings of the two mixes, the polyvinylchloride plasticized with di-allyloxyethyl phthalate had substantially superior physical properties to the polyvinyl chloride plasticized with di-2-ethylhexyl phthalate.

The polyvinyl chloride in the above example was a polymer of vinylchloride as essentially the sole polymerizable material. This is the most difficult vinyl chloride polymer to plasticize. Other so-called hard vinyl chloride polymers which have a content of combined vinyl chloride of at least 92% by weight and up to 8% by weight of combined other monoolefinic material, e. g. vinyl acetate, vinylidene chloride, methyl acrylate, methyl methacrylate or mixtures thereof, may also be plasticized with the di-allyloxyethyl phthalate plasticizer of the present invention.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A composition of matter comprising a vinyl chloride polymer containing at least 92% by weight of combined vinyl chloride and up to 8% by weight of combined other monoolefinic material, and 30 to 100 parts of di-allyloxyethyl phthalate per 100 parts of said polymer.

2. A composition of matter comprising a vinyl chloride polymer containing at least 92% by weight of combined vinyl chloride and up to 8% by weight of combined other monoolefinic material, and 50 to 80 parts of di-allyloxyethyl phthalate per 100 parts of said polymer.

3. A composition of matter comprising polyvinyl chloride and 30 to 100 parts of di-allyloxyethyl phthalate per 100 parts of said polyvinyl chloride.

4. A composition of matter comprising polyvinyl chloride and 50 to 80 parts of di-allyloxyethyl phthalate per 100 parts of said polyvinyl chloride.

PLINY O. TAWNEY.

REFERENCES CITED

The following references are of record in the file of this patent:

UNITED STATES PATENTS

| Number | Name | Date |
| --- | --- | --- |
| 2,413,197 | Smith | Dec. 24, 1946 |